(12) United States Patent
Britt et al.

(10) Patent No.: US 11,392,723 B2
(45) Date of Patent: Jul. 19, 2022

(54) DATA BREACH PREVENTION AND REMEDIATION

(71) Applicant: Cyber Team Six, Huntersville, NC (US)

(72) Inventors: Jason Britt, Birmingham, AL (US); Patrick A. Westerhaus, Huntersville, NC (US)

(73) Assignee: Cyber Team Six, Huntersville, NC (US)

( * ) Notice: Subject to any disclaimer, the term of this patent is extended or adjusted under 35 U.S.C. 154(b) by 272 days.

(21) Appl. No.: 16/879,683

(22) Filed: May 20, 2020

(65) Prior Publication Data
US 2021/0006573 A1 Jan. 7, 2021

Related U.S. Application Data

(60) Provisional application No. 62/897,197, filed on Sep. 6, 2019, provisional application No. 62/870,332, filed on Jul. 3, 2019.

(51) Int. Cl.
*H04L 29/06* (2006.01)
*G06F 21/64* (2013.01)
(Continued)

(52) U.S. Cl.
CPC .......... *G06F 21/64* (2013.01); *G06F 16/245* (2019.01); *G06F 16/258* (2019.01);
(Continued)

(58) Field of Classification Search
CPC ...... G06F 21/64; G06F 16/245; G06F 16/258; G06F 21/602; G06F 21/6227; G06F 21/6245; H04L 9/3239; H04L 63/1416
See application file for complete search history.

(56) References Cited

U.S. PATENT DOCUMENTS 9,640,001 B1   5/2017   Vazquez et al.
9,961,053 B2   5/2018   Yedidi et al.
(Continued)

FOREIGN PATENT DOCUMENTS

EP   3 149 644 B1   8/2018

OTHER PUBLICATIONS

International Search Report and Written Opinion issued in International Application No. PCT/US19/59714, dated Jan. 21, 2020 (Jan. 21, 2020). 15 pages.
(Continued)

*Primary Examiner* — Shin-Hon (Eric) Chen
(74) *Attorney, Agent, or Firm* — Mintz, Levin, Cohn, Ferris, Glovsky and Popeo, P.C; Andrew Skale, Esq.; F. Jason Far-hadian, Esq.

(57) ABSTRACT

Computer-implemented threat detection method and systems are provided. The method comprises discovering threat data associated with a first entity, translating the threat data to one or more threat models, translating the one or more threat models, using a threat model parameter generator, to at least a parameter threat model and translating the parameter threat model to one or more identification queries. The one or more identification queries may be executed and the generated results may be translated to result data in a first format. The one or more result data models may be published from the result data in one or more formats or to one or more locations.

19 Claims, 7 Drawing Sheets

(51) Int. Cl.
    *G06F 21/60* (2013.01)
    *H04L 9/32* (2006.01)
    *G06F 21/62* (2013.01)
    *G06F 16/245* (2019.01)
    *G06F 16/25* (2019.01)
    *H04L 9/40* (2022.01)

(52) U.S. Cl.
    CPC ........ *G06F 21/602* (2013.01); *G06F 21/6227* (2013.01); *G06F 21/6245* (2013.01); *H04L 9/3239* (2013.01); *H04L 63/1416* (2013.01)

(56) References Cited

U.S. PATENT DOCUMENTS

| | | | |
|---|---|---|---|
| 10,051,001 | B1 | 8/2018 | Ashley et al. |
| 10,277,623 | B2 | 4/2019 | Wang |
| 2008/0148398 | A1* | 6/2008 | Mezack ............... H04L 63/1416 726/22 |
| 2011/0131131 | A1 | 6/2011 | Griffin et al. |
| 2018/0007087 | A1 | 1/2018 | Grady et al. |
| 2018/0173891 | A1 | 6/2018 | Wang |
| 2019/0028498 | A1* | 1/2019 | Fach ....................... G06N 20/20 |
| 2019/0149564 | A1* | 5/2019 | McLean ............... H04L 63/1416 713/171 |
| 2019/0173923 | A1* | 6/2019 | Skowyra ............. H04L 63/1433 |
| 2020/0067962 | A1* | 2/2020 | Tan ..................... G06F 16/2455 |
| 2020/0204569 | A1* | 6/2020 | Komarek .............. G06K 9/6269 |
| 2021/0064761 | A1* | 3/2021 | Kawakita ................ G06F 21/44 |

OTHER PUBLICATIONS

International Search Report and Written Opinion issued in International Application No. PCT/US2019/059713, dated Jan. 16, 2020 (Jan. 16, 2020). 14 pages.

* cited by examiner

DATA BREACH PREVENTION AND REMEDIATION

CROSS-REFERENCE TO RELATED APPLICATIONS

The present application claims priority to and the benefit of the earlier filing date of Provisional Application Ser. Nos. 62/870,332, and 62/897,197, filed on Jul. 3, 2019 and Sep. 6, 2019, respectively, the content of which is incorporated by reference herein in entirety.

TECHNICAL FIELD

The disclosed subject matter generally relates to data security and, more particularly, to managing credential or sensitive data which may have been compromised.

BACKGROUND

Data security is of paramount importance especially when the data includes sensitive, personal or confidential information. A breach in data security often leads to theft of data where sensitive or critical information is copied, transmitted or viewed unlawfully or without authorization.

Theft of sensitive data that includes financial information (e.g., credit card or bank account numbers), personal information (e.g., medical data, social security number, driver license number, etc.), secrets (e.g., government data, intellectual property, trade secret, etc.) or a combination thereof can have sever ramifications for the owners of the data and institutions that are tasked with maintaining the data secure.

Unfortunately, data breaches can be detrimental to businesses, individuals, financial institutions and governmental entities. It is now well known that such incidents can lead to interference with business or political practices, financial loss, damage to reputation, identity theft and other serious threats. A variety of shortcomings can lead to a security breach, depending on the entities that have been compromised and their customers or constituents.

Such shortcomings include unknown design vulnerabilities, computing bugs, naïve user behavior, weak credential authentication settings and mechanisms and other factors that can render a data system susceptible to attack. Some of these factors may involve phishing sites that imitate a login page, malware that is non-active but has gathered usernames and passwords from infected machines, or usernames and passwords collected from data breaches.

SUMMARY

For purposes of summarizing, certain aspects, advantages, and novel features have been described herein. It is to be understood that not all such advantages may be achieved in accordance with any one particular embodiment. Thus, the disclosed subject matter may be embodied or carried out in a manner that achieves or optimizes one advantage or group of advantages without achieving all advantages as may be taught or suggested herein.

Computer-implemented threat detection method and systems are provided. The method comprises discovering threat data associated with a first entity, translating the threat data to one or more threat models, translating the one or more threat models, using a threat model parameter generator, to at least a parameter threat model and translating the parameter threat model to one or more identification queries. The one or more identification queries may be executed and the generated results may be translated to result data in a first format. The one or more result data models may be published from the result data in one or more formats or to one or more locations.

The result data may be aggregated and translated to a second format based on a format suitable for use by the first entity. The result data may be translated to a second format based on a format suitable for a computing technology used by the first entity. The treat data may include indicators of financial compromise (IOFC). The IOFC may be associated with at least one of partial account information, compromised login information, malware netflow, malicious proxy sessions, compromised card information and phishing domains.

In certain embodiments, the parameter threat model includes parameters associated with at least one of equality, inequality, full text, and partial text matches, wherein the parameters are used to identify a threat target associated with the first entity. The parameter threat model is collected from a parameter model interface to translate the parameter threat model into the one or more identification queries based on computing technology or configuration used by the first entity's database implementation.

In accordance with one or more implementations, the computing technology is associated with at least one of a database query language or a distributed search engine utilized by the first entity for managing data. The result data model includes at least one of the first entity's unique customer identifier, compromise timestamp, threat tag, attribution tag, provider tag and feed tag from the result data. A single IOFC may be utilized to create several threat models of the same or different threat model types.

In certain aspects, a data validation system and method is provided. The method comprising generating a data set associated with a first credential information; submitting the data set to a data provider over a computing network to validate the first credential information, the data provider analyzing the data set to determine whether a match is found for the first credential information based on second credential information known to have been compromised; and in response to a match being found, determining that the first credential information has been potentially compromised.

In one embodiment, the method may comprise generating a data set associated with a first sensitive or secret information; submitting the data set to a data provider over a computing network to validate the sensitive or secret information, the data provider analyzing the data set to determine whether a match is found based on information known to have been compromised; and in response to a match being found, determining that the sensitive or secret information has been potentially compromised.

The processes and methodology disclosed above may be incorporated into a computer-implemented system or computer program product, depending on implementation, in accordance with certain embodiments. The details of one or more variations of the subject matter described herein are set forth in the accompanying drawings and the description below. Other features and advantages of the subject matter described herein will be apparent from the description and drawings, and from the claims. The disclosed subject matter is not, however, limited to any particular embodiment disclosed.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations as provided below.

The figures may not be to scale in absolute or comparative terms and are intended to be exemplary. The relative placement of features and elements may have been modified for the purpose of illustrative clarity. Where practical, the same or similar reference numbers denote the same or similar or equivalent structures, features, aspects, or elements, in accordance with one or more embodiments.

DETAILED DESCRIPTION OF EXAMPLE IMPLEMENTATIONS

In the following, numerous specific details are set forth to provide a thorough description of various embodiments. Certain embodiments may be practiced without these specific details or with some variations in detail. In some instances, certain features are described in less detail so as not to obscure other aspects. The level of detail associated with each of the elements or features should not be construed to qualify the novelty or importance of one feature over the others.

When a security breach compromises credential data (e.g., username, password) or any type of sensitive or secret data, it is important to efficiently and quickly identify the compromised data and take proactive steps to mitigate the breach. For example, if it is determined that a bank customer's username or password has been compromised, the customer can be notified. The customer may be also asked to change the compromised data. The present disclosure is directed to systems and methods that can efficiently identify compromised data and effectively remediate an existing security threat.

Figure 1:
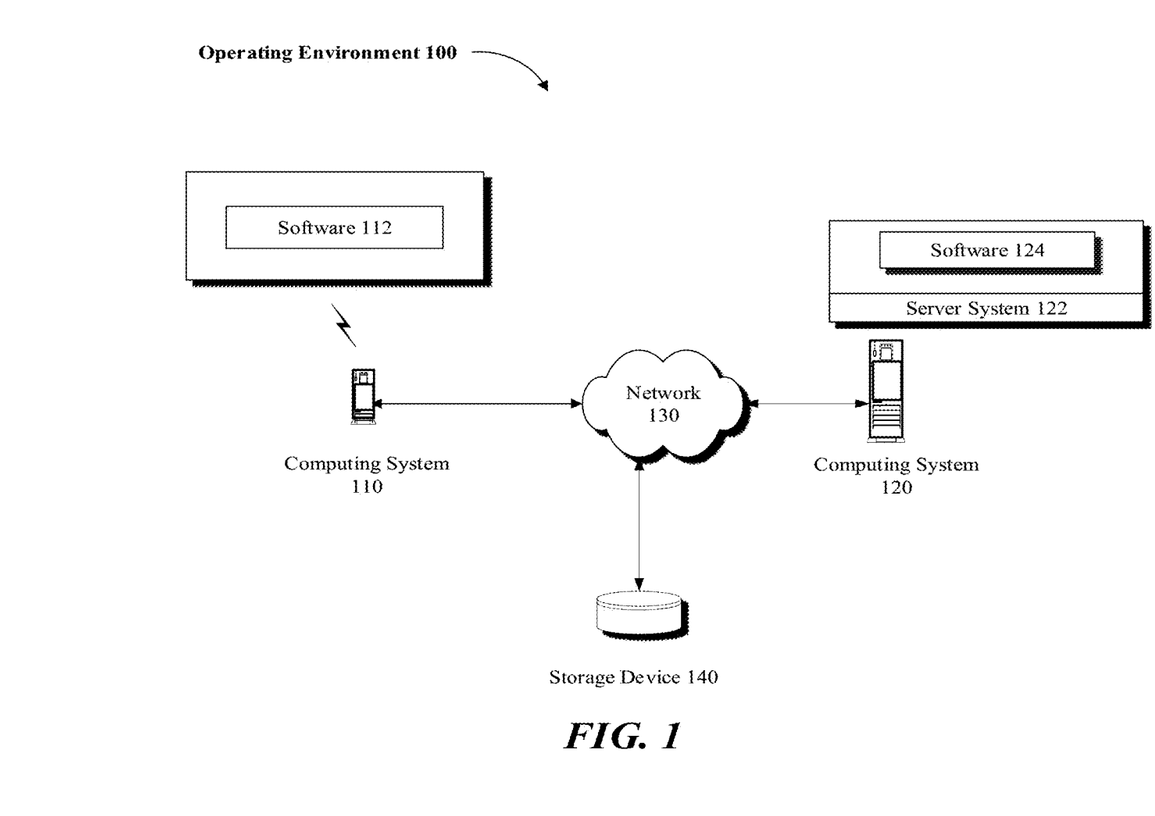
FIG. 1 illustrates an example operating environment for credential validation, in accordance with one or more embodiments, in which the operations and functionalities disclosed herein may be implemented.

Referring to FIG. 1, an example operating environment 100 is illustrated in which a computing system 110 may be used to interact with software 112 being executed on computing system 110. The computing system 110 may be a general-purpose computer, a handheld mobile device (e.g., a smart phone), a tablet (e.g., an Apple iPad®), or other communication capable computing device. Software 112 may be a web browser, a dedicated app or other type of software application running either fully or partially on computing system 110 for the purpose of managing customer credential data and detecting potentials for security breach.

Computing system 110 may communicate over a network 130 to access data stored on storage device 140 or to access services provided by a computing system 120. Depending on implementation, storage device 140 may be local to, remote to, or embedded in one or more of computing systems 110 or 120. A server system 122 may be configured on computing system 120 to service one or more requests submitted by computing system 110 or software 112 (e.g., client systems) via network 130. Network 130 may be implemented over a local or wide area network (e.g., the Internet).

Computing system 120 and server system 122 may be implemented over a centralized or distributed (e.g., cloud-based) computing environment as dedicated resources or may be configured as virtual machines that define shared processing or storage resources. Execution, implementation or instantiation of software 124, or the related features and components (e.g., software objects), over server system 122 may also define a special purpose machine that provides remotely situated client systems, such as computing system 110 or software 112, with access to a variety of data providers and services, as provided in further detail below.

In accordance with one or more implementations, the provided services by the special purpose machine (e.g., server system 122 or software 124) may include providing an operating environment 100 which supports an interface between a customer system, implemented on computing system 110, and one or more data providers implemented on one or more computing systems 120, for example. Software 112 running on computing system 110 may be configured to provide validation information over network 130 to computing system 110 in a secure manner. Software 124 running on server system 122, in relationship with software 112, may be configured to determine if the provided sensitive data or credential information (e.g., username and/or password) are potentially compromised.

Figure 2:
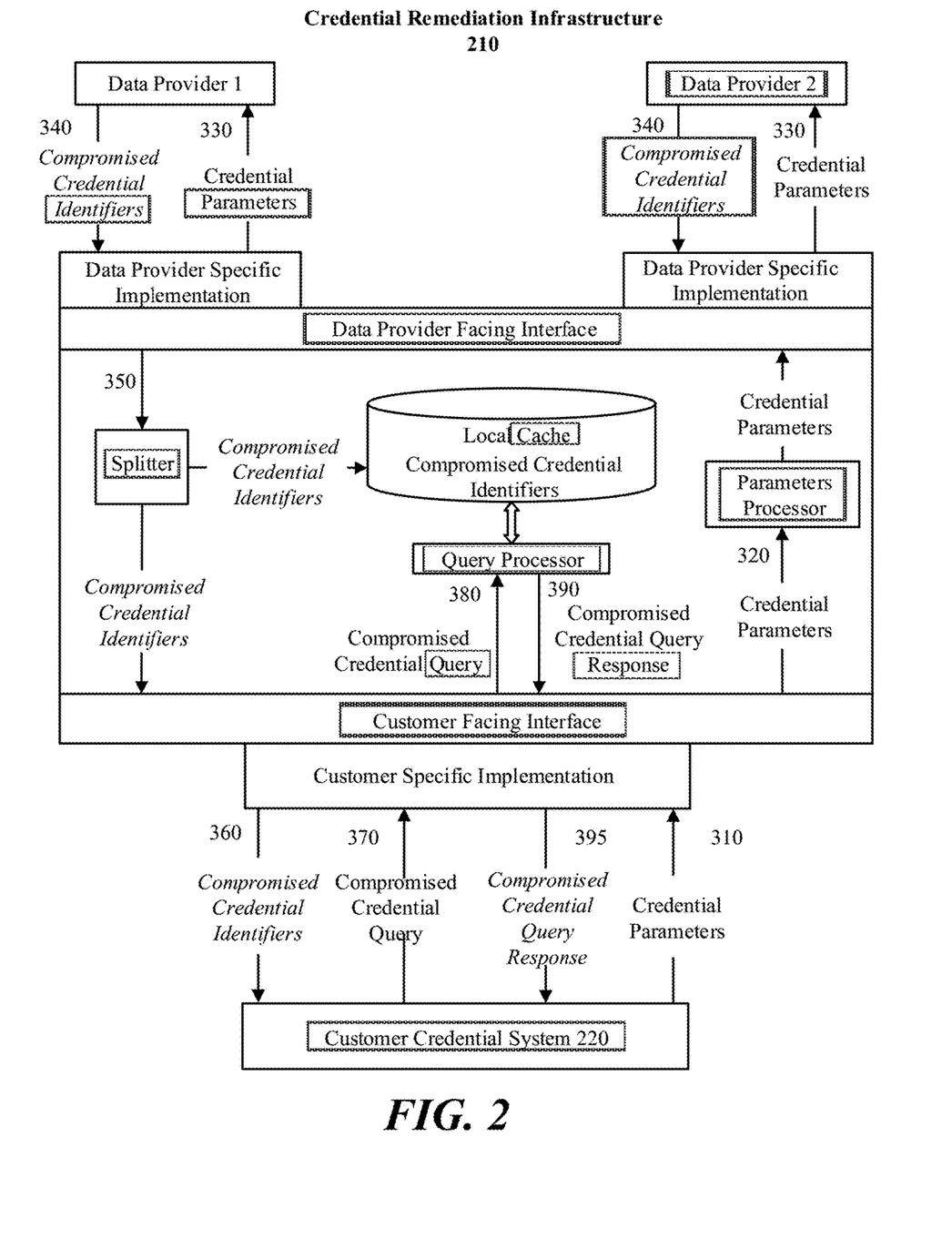
FIG. 2 is a block diagram of an exemplary system for identifying compromised credentials in accordance with one or more embodiments.

Referring to FIG. 2, a credential remediation infrastructure 210 may be implemented as supported by operating environment 100 to help one or more institutions that store confidential, private or secret information maintain the integrity of such information by continually checking whether the credential information for any of their customers has been compromised. As shown, the credential remediation system 210 may include a customer credential system 220 that communicates with one or more data providers (e.g., data providers 1 and 2). An interface platform, for example including an application programming interface (API), may be provided that has a customer facing interface or a data provider facing interface, or both, depending on implementation.

In certain embodiments, a processing and storage platform may be provided that includes at least one data splitter, a data caching mechanism, and one or more data processors (e.g., query processors, parameters processors, etc.). The computer interface may be configured to support a data provider implementation and a customer specific implementation. The customer specific implementation may be configured as a portion of the customer facing interface to communicate data according to a transmission protocol or specific transmission attributes of the customer credential system 220. The data provider specific implementation, on the other hand, may be configured as a portion of the data provider facing interface to communicate with the one or more data providers.

In some implementations, the data provider 1 and the data provider 2 may have a proprietary or customized implementation as configurable to communicate with the data provider facing interface. Relying on the interface components noted above, the customer credential system 220 may communicate with the data providers to determine which customer or user credentials are possibly compromised. If compromised user credentials are identified, the credentials can be replaced by new credentials by requesting a user to change his username and password. To ensure secured transmission, in one example embodiment, customer credential system 220 may use a hash algorithm to provide hashes of credential information to one or more data providers.

In one example scenario, instead of a full hash, a partial hash of the credential information may be calculated. To further secure (e.g., encrypt) the transmission of credential information, a random text (e.g., "salt") may be also added to the partial hash. An encrypted credential information may be transmitted to the one or more data providers by way of a series of intermediary components in the implemented interface, as provided in further detail herein. A data provider, upon receiving the encrypted credential information may apply the same hash algorithm to a series of credentials that are known to have been compromised.

Information about the hash algorithm and salt used to encrypt the credentials may be forwarded to the data provider, either along with the encrypted credentials or independently during a separate transmission. Without limitation, various procedures may be implemented or utilized by a provider to determine whether or not customer credentials have been compromised. The provider may have obtained the compromised credentials by performing a search on the dark web, for example.

Accordingly, a data provider may generate full or partial hashes of the compromised credentials and compare the generated hash values with the hash values transmitted from the customer credential system 220 to the data provider. A Bloom filter, for example, which can indicate that a match is possibly found (or definitely not found) may be utilized by the data provider to determine whether a credential submitted by the customer credential system 220 matches a known compromised credential. If a match is found (or is likely to be found), the data provider may notify the customer credential system that certain credentials associated with the hash have been compromised.

In embodiments where a partial hash is provided to the data provider, the data provider may return to the customer credential system 220 the full hash of the matched credential and additional information about the matched credential (e.g., the nature of the threat). Customer credential system 220, upon receiving the information about the potential match, may compare the full hash of the credential information (e.g., the full hash of the username assigned to a customer) with the full hash of matched credentials provided by the provider. If there is a match, then customer credential system 220 may notify a customer or the corresponding institution (e.g., a bank) that the credential has been compromised.

In some embodiments, once it is determined that a certain credential (e.g., a username) is compromised, additional credential information (e.g., password data, pin, etc.) associated with the matched credential may be also analyzed to determine the extent of the breach or security threat. This analysis may be performed by the customer credential system 220, the data provider or an independent entity. Furthermore, as noted earlier, additional information about the breach may be also provided by the data provider. Such information may include, for example, the source of the breach or any other attributes or characteristics related to the breach that may be useful for the purpose of mitigating or remediating the breach or associated security concern.

In accordance with one implementation, if it is determined that a customer's credentials are compromised, the customer may be contacted and asked to update or change his or her credentials (e.g., username, password, etc.). When the customer updates the credentials, the updated credential values may be submitted to the provider to ensure the updated credentials are not on the list of known compromised credentials. If so, the customer may be prompted not to use the new credential.

In accordance with another implementation, a cache mechanism may be implemented to store information about compromised credentials as the corresponding information is received from the one or more data providers. In certain scenarios, instead of forwarding credential-related data to the data providers for monitoring, the credentials (e.g., new or updated credential data) may be compared with the information in the cache. This implementation can improve credential validation efficiency and speed by avoiding the latency associated with having to transmit the credential information to data providers that are remotely situated. In an embodiment where the cache mechanism is implemented locally in relation to the customer credential system 220, credential validation can advantageously take place in real-time or near real-time in an expedited manner, due to time savings and resource efficiencies associated with accessing a local cache.

Figure 3A:
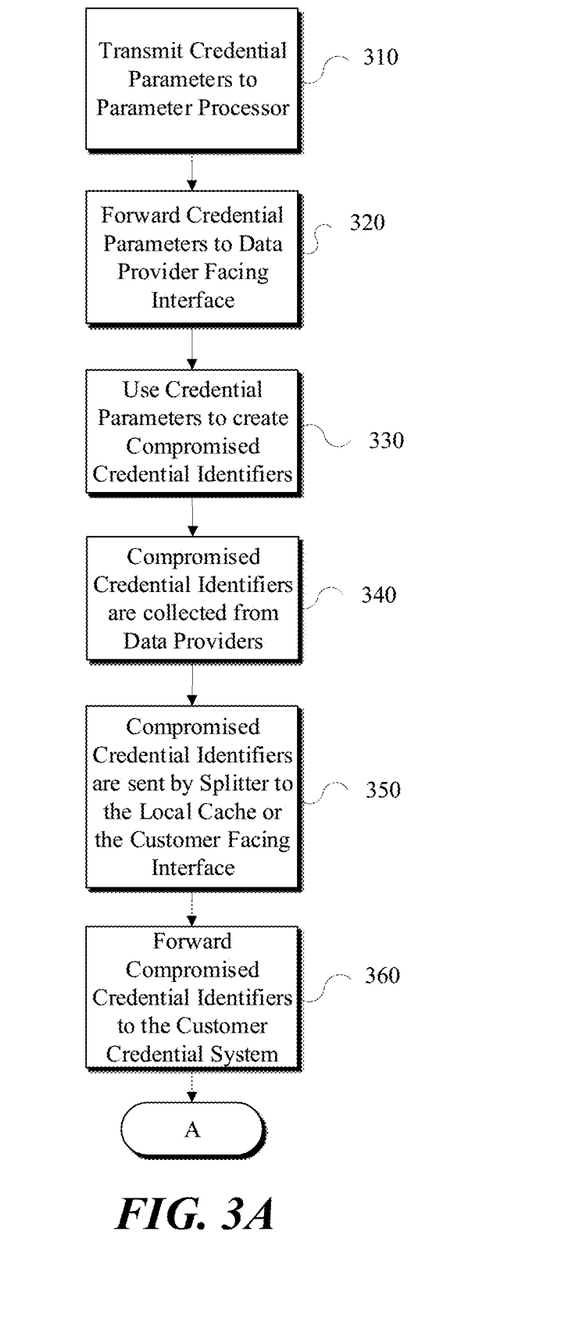
FIGS. 3A and 3B are flow diagrams of a method of determining whether certain credentials have been compromised, in accordance with an example implementation.
Figure 3B:
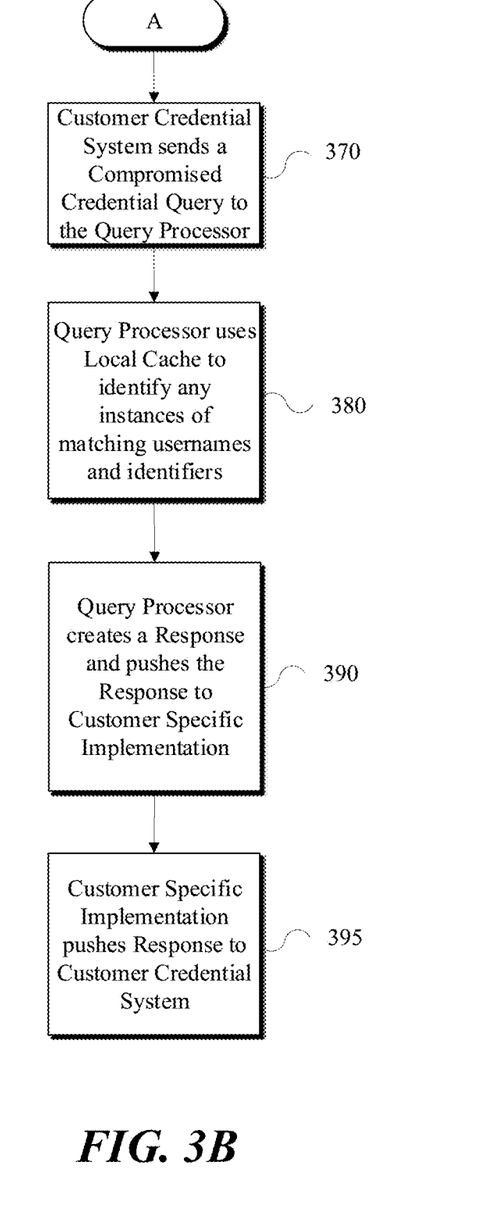

Referring to FIGS. 2, 3A and 3B, a more detailed example of credential validation and data breach remediation is provided, in accordance with one or more embodiments. It is noteworthy that the details provided are by way of example and certain steps, processes and features may be implemented or performed in different configurations or orders or using similar or completely different types of computing resources, which may be capable of performing the same functionalities or operations.

As provided in further detail herein, the customer credential system 220 may invoke a process to validate one or more credentials for one or more users or customers. The validation process may be invoked for a single customer, for example, when the customer initially sets up a username and password, or at a time when the customer updates the credentials. In alternative embodiments, a batch process may be executed at predetermined time intervals (e.g., daily or weekly) to invoke a validation process to validate the credential data periodically.

As shown in FIG. 3A, the customer credential system 220 may thus collect and transmit credential-related parameters (e.g., hashed usernames or passwords, prefixed or postfixed salt, the hashing algorithm used to hash the username or password) to a parameter processor via the customer specific implementation of a customer facing interface (310). The parameter processor may forward the credential parameters to the data providers via the data provider facing interface (320). The data providers may use the credential parameters to identify possibly compromised credentials and create compromised credential identifiers to send back to the customer credential system 220 (330).

The credential identifiers are collected from data providers using a data provider specific fetching implementation to get converted and tagged (340). A data splitter may be configured to pull compromised credential identifiers via the data provider facing interface and store the compromised credential identifiers to a local cache and/or send the compromised credentials to the customer credential system 220 via the customer facing interface, for example (350). A customer specific implementation may capture, pull or receive new compromised credential identifiers from the splitter via the customer facing interface and pushes the information to the customer credential system 220 (360). Accordingly, the customer credential system 220 may be provided with an identification of one or more credentials that may have been compromised.

In some embodiments, to confirm that the partial hash values associated with the potentially compromised credentials are the same as that of a customer of the querying institution, the customer credential system 220 may request for additional information to be provided by the one or more data providers. For example, a complete hash value of the comprised credential (e.g., username) and other associated credentials (e.g., password) may be calculated or requested. The additional information provided, in comparison to the information available to customer credential system 220, may indicate or confirm that the potentially compromised credentials match. If so, then it is confirmed that the potentially compromised credentials are in fact compromised. Accordingly, the customer with compromised credentials may be requested to update the affected credential (e.g., update the old username and password) with new credentials.

Referring to FIG. 3B, in certain embodiments, the newly updated credentials (e.g., username and password) may be validated by way of the same or similar processes provided in FIG. 3A. In one implementation, for the purpose of efficiency, instead of forwarding the new credentials hashes all the way to the data providers, which may be remotely connected to the customer credential system 220, the credentials are instead submitted by way of a compromised credential query to a query processor to determine if the new credentials can be matched against already compromised credentials stored in a cache (370). The customer credential system 220 may thus create a compromised credential query that is forwarded to the query processor via the customer specific implementation and the customer facing interface.

The query processor may search the local cache to identify any instances that match the queried credential (e.g., match the customer's username and password identifiers) (380). The query processor creates a compromised credential query response and sets a flag (e.g., a binary value) depending on whether a match is found or not (e.g., flag=1 indicating a match, flag=0 indicating no match), and forwards a compromised credential query response to the customer specific implementation via the customer facing interface system (390). The customer specific implementation then provides or pushes the result back to the customer credential system 220 (395). In this manner, the customer may be notified that his credentials have been compromised.

Example embodiments are provided below to foster an overall understanding of the principles of the disclosed subject matter in relation to structures, functions and use of systems, devices, and methods that may be implemented to practice the various details provided herein. The features illustrated or disclosed in connection with the example embodiments may be combined with the features of other embodiments. Such modifications and variations are intended to be included within the scope of the present disclosure.

In accordance with one example implementation, a new username (e.g., MyUsername) is created in the customer credential system 220. The customer credential system 220 hashes the username using the Sha-128 hashing algorithm producing the hash (e.g., d3 aa75d3200eb071613 c384ba71e7244d087405a). The first 10 characters of the hashed username (d3aa75d320), the password salt (theSalt), and the hashing algorithm used to generate the stored password hash (sha-512) are sent to the provider. The customer specific implementation creates a credential parameters object from the data passed from the customer credential system 220 and pushes the new credential parameters object into the customer facing interface.

The parameter processor acquires the credential parameters object from the customer facing interface and pushes the credential parameters object to one or more data providers via the data provider facing interface. data provider specific implementation acquires the credential parameters object from the data provider facing interface. At least one data provider specific implementation translates the credential parameters object into the format required by the data provider and sends the newly formatted data to the data provider.

A data provider 1 may discover a username and password combination where the first 10 characters of the Sha-128 hash of the discovered username matches the first 10 characters of a Sha-128 hash of a username previously sent to the data provider. The data provider queues up the partial Sha-128 hash of the username (d3aa75d320), the password salt (theSalt), the hashing algorithm used to generate the stored password hash (sha-512), the first 10 characters of the password hash (432df41104), threat tags (databreach onlineforum), and attribution tags (fraudster[@]fraud.com). The data provider specific implementation pulls the information from the data provider and creates a compromised credential identifiers object with the follow exemplary attributes:

Username Partial Hash: d3aa75d320
Password Salt: theSalt
Password Hashing Algorithm: sha-512
Password Partial Hash: 432df41104
Threat Tags: databreach,onlineforum
Attribution Tags: fraudster[@]fraud.com
Provider: data provider 1
Feed: Feed 1

The data provider specific implementation would then push the compromised credential identifiers object to the data provider facing interface. The splitter pulls the compromised credential identifiers object from the data provider facing interface and sends the object to the local cache (e.g., a postgres relational database), via an insert query and the customer facing interface. The customer specific implementation pulls the compromised credential identifiers object from the customer facing interface. The customer may request a particularly formatted data (e.g., a .csv file) that is sent to another internal server (e.g., via a secure file transfer protocol). The customer credential system 220 receives the file and looks for any usernames and password combinations that have a matching partial hash. The customer also can track statistics on a provider, feed, threat tag, and attribution tag basis.

The following data types and operations may be utilized in one or more implementations:

Compromised credential identifiers may include the partial or full hash representation of a username and password as well as any salt prefixed or suffixed and the hashing algorithm used, plain text versions of the username and/or password. In addition to the username and password information, any additional information about the threat that compromised the credentials and any attribution information about who performed the compromised may be included.

Credential parameters may include a partial or full username hash representation as well as any salt prefixed or suffixed and the hashing algorithm used by the customer.

Compromised credential query may include a partial or full username hash representation, a partial or full password hash representation, a prefixed or suffixed password salt, and the password hashing algorithm.

Compromised credential query response may include a partial or full username hash representation, a partial or full password hash representation, a prefixed or suffixed password salt, the password hashing algorithm, and a true or false that indicates whether or not the underlying username and password combination is found to be compromised.

Inputs may include: (1) compromised credential identifiers from external data providers; (2) credential parameters from a customers credential system; (3) compromised credential queries from customers credential systems.

Outputs may include: (1) credential parameters sent to external data providers; (2) customized compromised credential identifiers sent to the customer's credential system; and (3) compromised credential query responses sent to the customer's credential system.

Operations: splitter takes compromised customer identifiers and pushes them to the local cache and to the customer specific implementation via the customer facing interface. The query processor takes compromised credential queries as input. It searches the local cache for possible username identifiers and if possible, matches are found checks for a possible password identifier match. The query processor then generates a compromised credential query response. If a username identifier and password identifier was found to match in the local cache, a true result is set in the compromised credential query response. If no match was found, then a false result is set in the compromised credential query response. The parameter processor takes newly created username identifiers pushed from the customer and publishes the results to any data providers that require username updates to push new compromised credential identifiers.

In summary, the disclosed credential remediation infrastructure 210 may be used to identify compromised username and passwords. The infrastructure can include a software system that utilizes externally provided identifiers that can be used to identify compromised username and passwords in a customer system. The externally provided identifiers may not be plaintext or encrypted username and password. They are instead identifiers such as hashes, partial hashes, and bloom filters. These identifiers are stored in the system and can also be queried by customer systems to determine if a username and password is compromised. The system can also enable customer systems to push username identifiers to external data providers to allow data providers to identify and create new compromised credential identifiers.

During an initial phase, the customer credential system may create and push credential parameters for each credential in the system. After the initial phase, the credential parameters may be pushed to the data providers. The data providers may provide all possibly matching compromised credentials. The initial phase pushed to the data provider and the response received from the data provider may be time consuming as the initial phase for collectively transferring a large volume of credential information between the system and the data providers. After the initial phase, additional pushes to the data providers can be limited to newly created usernames, which can be much smaller than the initial phase. Pulls from the data providers can include newly discovered matching username compromised credentials and historically compromised credentials for newly created usernames.

Figure 4:
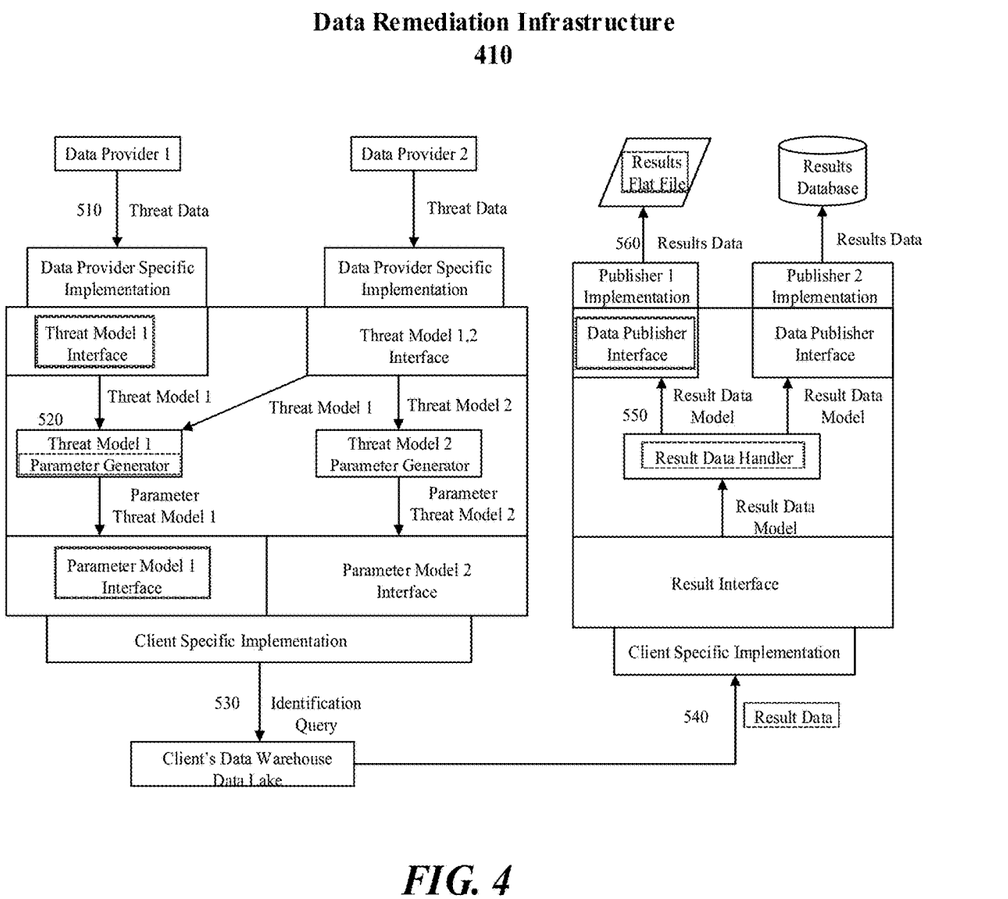
FIG. 4 is a block diagram of an exemplary system for identifying compromised sensitive or secret information in accordance with one or more embodiments.
Figure 5:
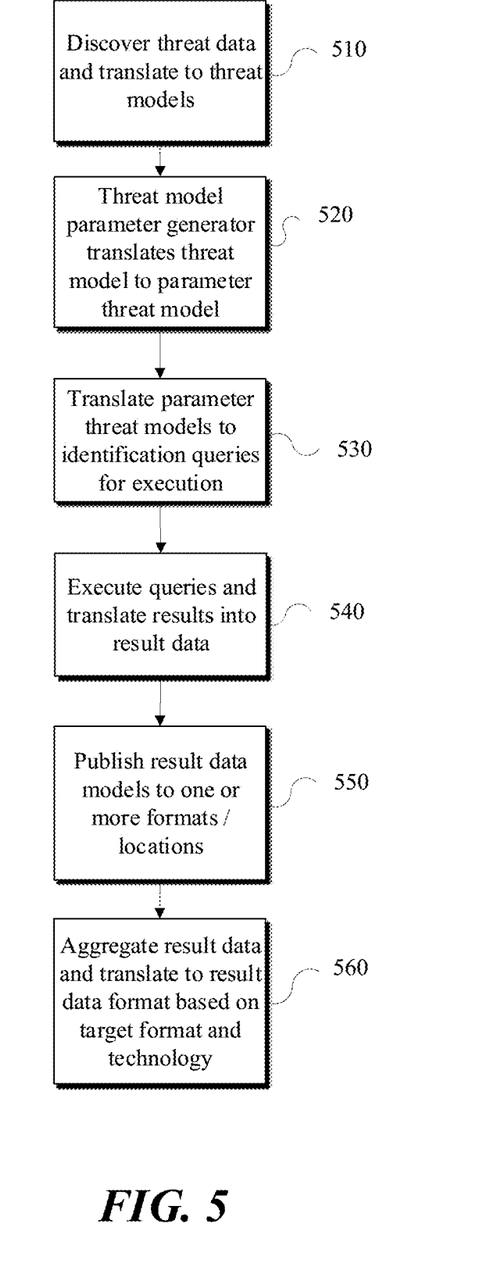
FIG. 5 is a flow diagram of a method of determining whether sensitive or secret information has been compromised, in accordance with an example implementation.

Referring to FIGS. 4 and 5, in accordance to certain aspects, a system (e.g., a data remediation infrastructure 410) may be implemented to utilized some or all of the above disclosed features to identify compromised account numbers, credit card numbers, or other types of sensitive or secret data. In addition to, or instead of, detecting compromised credential data, one or more embodiments of the system may be configured to monitor IP address and timestamp of communication packets between one or more nodes in a communications network to monitor the transmission of sensitive information. The system may be used to identify customer machines that are infected with malware, so that a provider can intercept the malware or data related to compromised sensitive data (e.g., compromised credit card numbers).

Referring to FIG. 4, the illustrated system takes externally provided indicators of financial compromise (IOFC), such as partial account information, compromised login information, malware netflow, malicious proxy sessions, compromised card information and phishing domains that are tagged with threat information and attribution information as input. Using threat model generators, the system transforms the IOFC into a parameter model that, for example, includes equality, inequality, partial number and partial text matching criteria. The parameter models are then used by the client specific implementation to develop queries against the client's data warehouse or data lake to identify matching client customers.

A client specific unique customer text or numeric identifier may be returned from a client data storage pool (e.g., a data warehouse or data lake) to the client specific implementation. The client specific implementation then pushes the results to the results interface. The results data queue then publishes the results via the data publisher interface and publisher implementation to an output format such as a flat file, database, application programming interface, or other output format needed by the client. For the data provider to know when an IOFC may be relevant to a client, the data provider is given at least one of the client's card bin list, domains owned by the client, brand names used by the client, or IP addresses owned by the client offline.

Threat data may be the data sent by the data provider that includes one or more IOFCs that the data provider believes relate to one or more of the client's customers and a compromise timestamp. The threat data may also include information about the threat targeting the client customer(s) and an individual or group behind the threat. A threat model object may include an IOFC, compromised timestamp, threat tags, attribution tags, provider tag, and a feed tag. A parameter threat model may include one or more parameter entries, compromise timestamp, threat tags, attribution tags, a provider tag, and a feed tag. A parameter entry may be an equality, inequality, full text match, or partial text match operator and a value to match or compare.

An identification query may be configured as a format and technology specific query implementation to identify a client customer that matches the parameters defined in the parameter threat model from which the identification model was developed. It may also include the compromised timestamp, threat tags, attribution tags, the provider tag, and feed tag from the parameter threat model. The result data is the format and technology specific query result produced by the Client's Data Warehouse/Data Lake for the identification query. The result data may include the client's unique customer identifier. It may also include the compromise timestamp, threat tags, attribution tags, the provider tag, and feed tag from the identification query.

The result data model may be in a predetermine format (e.g., DeltaQ form) of the result data from the client's Data Warehouse/Data Lake. The result data model may include the client's unique customer identifier, compromise timestamp, threat tags, attribution tags, the provider tag, and the feed tag from the result data. The input can include threat data, result data, etc. The output data can include identification query and result data. In an example embodiment, a threat model X Parameter Generator intakes associated threat model X objects. The threat model X Parameter Generator then translates parameter threat model X objects by generating parameters such as equality, inequality, full text, and/or partial text matches needed to identify a single client customer. The parameters generated for the parameter threat models are specific to each type of threat model. The results data handler intakes result data models and pushes results data models to one or more data publisher interface instances as needed by the client.

FIG. 5 is a flow diagram of an exemplary method for identifying data breaches.

At 510, a newly discovered IOFCs may be communicated to the client, such that one or more matching client customers are identified and matched to a result format and location defined by the client as published. When a data provider discovers a new client related IOFC, the IOFC is queued for pickup. The data provider specific implementation polls the data provider for new IOFCs and translates the data into threat models and pushes the threat models into the system via threat model interfaces. A single IOFC may create several threat models of the same or different threat model types. A threat model may have a separate threat model interface, depending on implementation. A threat model parameter generator may be also provided for one or more threat models.

At 520, threat models may be pushed into threat model interfaces and the matching threat model parameter generator. The threat model parameter generator translates the threat model into a parameter threat model that includes one or more equality, inequality, full text, and partial text matches needed to identify an individual client customer being targeted by a threat. Accordingly, newly generated parameter threat model may be pushed into a matching parameter model interface.

At 530, the client specific implementation receives or collects parameter threat models from one or more parameter model interfaces. The client specific implementation translates the parameter threat models into identification queries for the technology (SQL Database, elastic search engine, etc.) and configuration used by the Client's Data Warehouse/Data Lake. The client specific implementation may execute the identification queries and sets the result data to return to the client specific implementation.

At 540, the result data generated by the Client's Data Warehouse/Data Lake is returned to the client specific implementation. The result data may include the client's unique customer identifier as well as one or more threat tags and attribution tags associated with the IOFC that was used to create the threat model initially received. The client specific implementation translates the result data into the result data model and provides the result data model to the results interface.

At 550, the result data handler receives or collects the result data models from the results interface. The results data handler then provides the result data models to be published to one or more formats or locations via the data publisher interface.

At 560, publisher implementations provides the result data models via the data publisher interface. The publisher implementations then connect to the location and technology to aggregate result data. The publisher implementations then translate the result data models into a result data format specific for the technology and format needed by the client.

For additional clarity, the following provides an example of a scenario when data provider discovers a new malware compromised online banking (OLB) username IOFC. Assume malicious software called malware A has infected a machine belonging to a customer of the client. When the customer visited the client's online banking login malware A collected the login URL and login information including the customer's OLB username and password. After login, the malware collected additional account information including banking account listings including product names, balances, and additional customer information accessed by the customer after login.

In an example scenario, malware A may send the stolen information to its command and control server. A first data provider may find the compromised information using proprietary means and identify the compromised login URL as including the client's login domain as provided below.

(1) The first data provider identifies a malware compromised OLB username for the client's customer and queues the data (username 1) along with the malware name (malware A), compromise timestamp (01/01/2019 01:00:0000), and an associated bad actor's email (fraudster[@]fraud.com) in a flat file representation. The specific implementation for the first data provider authenticates to first data provider webserver via a post. The implementation then downloads the queued flat file including the malware compromised OLB username IOFC using a command (e.g., a wget command) to first data provider's webserver. The downloaded file is then parsed and turned into an OLB Username threat model. The OLB Username threat model includes the following:

OLB Username: username_1
Threat Tags: Malware, malware A
Attribution Tags: fraudster[@]fraud.com
Provider Tag: first data provider
Feed Tag: feed_1

The threat model is then pushed into the OLB Username threat model interface. The OLB username threat model parameter generator receives the OLB Username threat model. It creates a new OLB username parameter threat model including the following:

Parameter Entries: {equality, username_1}
Provider Tag: first data provider
Feed Tag: feed_1
Compromise Timestamp: 01/01/2019 01:00:0000
Threat Tags: malware, malware A
Attribution Tags: fraudster[@]fraud.com The OLB username parameter threat model is pushed to the OLB username parameter model interface. The client specific implementation receives the OLB username parameter threat model from the OLB username parameter model interface. In this example, the client uses a relational database that implements the SQL standard and the client has specified non batch queries to be used. Also, assume the client has a table that lists active OLB usernames and the associated unique customer identifier. The client specific implementation then generates an SQL select statement. The additional tagged information can be included in the select statement to be returned. Here is an example of what it could look like:

Select 'first data provider', 'feed_1', '01/01/2019 01:00: 0000', {malware,malware A}', {fraudster[@]fraud.com}', customer unique identifier from active_OLB_usernames_table where OLB_username=username_1.

The client specific implementation receives the values returned by the select statement and translates them into a result data model. The result data model includes the following:

Customer Identifier: 123456789
Provider Tag: first data provider
Feed Tag: feed_1
Compromise Timestamp: 01/01/2019 01:00:0000
Threat Tags: malware, malware A
Attribution Tags: fraudster[@]fraud.com The result data model is then pushed into the results interface. The results data handler receives the result data model and pushes the results data model one or more data publisher interfaces.

The Flat File publisher implementation receives the result data model from the data publisher interface and translates the result data model into a single line entry in a .csv file, such as the following, for example:

Customer Identifier, Provider Tag,Feed Tag,Compromise Timestamp, Threat Tags,Attribution Tags 123456789, first data provider,feed_1,01/01/2019 01:00:0000, malware A,fraudster[@]fraud.com The database publisher implementation receives the result data model from the data publisher interface and translates the result data model into an insert statement to be added to a relational database and executes the insert statement.

Other types of IOFCs would follow the same process, but there may be more parameter entries in the parameter threat model. A few examples of other types of IOFCs translated and tagged in a threat model may be as follows:

Compromised Card threat model
Compromised Card: 1111222233334444
Provider Tag: first data provider
Feed Tag: feed_2
Compromise Timestamp: 01/01/2019 01:00:0000
Threat Tags: phishing, phish_campaign_B
Attribution Tags: cardPhisher[@]fraud.com
Malicious Proxy Session
Proxy IP Address: 111.222.333.444
Provider Tag: first data provider
Feed Tag: feed_3
Compromise Timestamp: 01/01/2019 01:00:0000
Threat Tags: malicious proxy
Attribution Tags: proxy[@]fraud.com,ForumHandle
OLB Sales Ads
Ad Account Entries
Entry 1
Customer Defined Name: My Checking
Product Name: Checking Type 1
Type: Checking
Last Four Digits of Account: 1234
Amount: 1234.56
Entry2
Customer Defined Name: Savings
Product Name: Savings Type 1
Type: Savings
Last Four Digits of Account: 5678
Amount: 7890.12
Provider Tag: first data provider
Feed Tag: feed_3
Compromise Timestamp: 01/01/2019 01:00:0000
Threat Tags: malicious proxy
Attribution Tags: proxy[@]fraud.com,ForumHandle Referring to FIG. 6, a block diagram illustrating a computing system 1000 consistent with one or more embodiments is provided. The computing system 1000 may be used to implement or support one or more platforms, infrastructures or computing devices or computing components that may be utilized, in example embodiments, to instantiate, implement, execute or embody the methodologies disclosed herein in a computing environment using, for example, one or more processors or controllers, as provided below.

Figure 6:
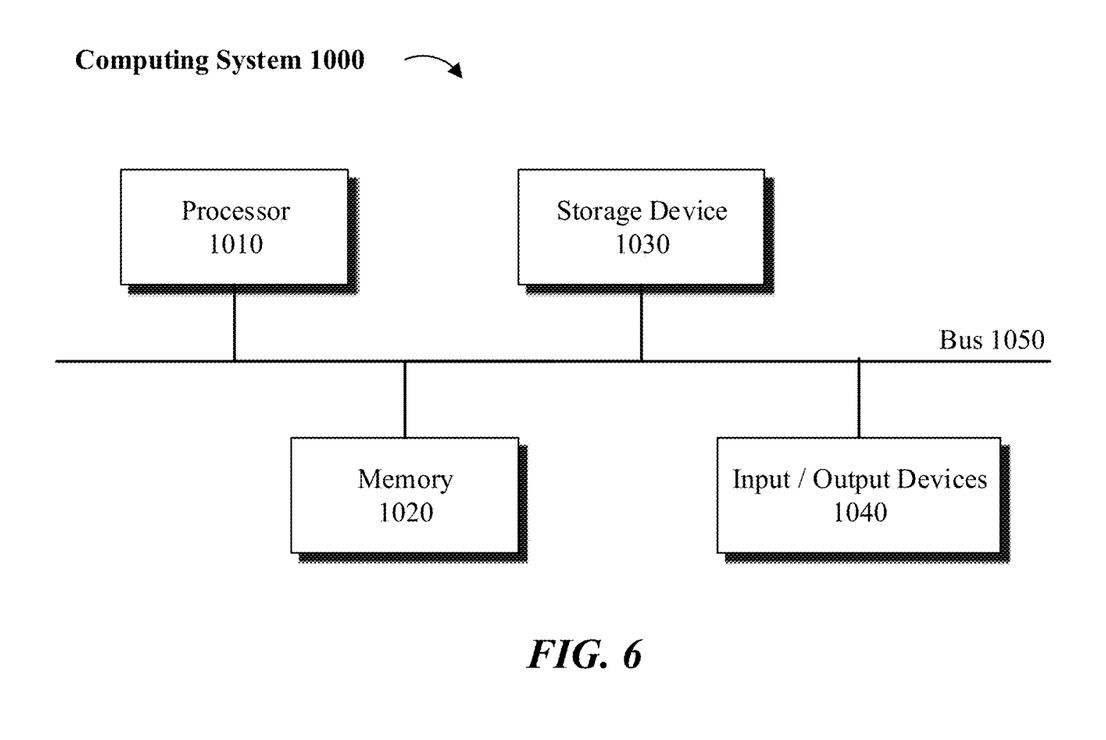
FIG. 6 is a block diagram of an example computing system that may be utilized to perform one or more computing operations or processes as consistent with one or more disclosed features.

As shown in FIG. 6, the computing system 1000 can include a processor 1010, a memory 1020, a storage device 1030, and input/output devices 1040. The processor 1010, the memory 1020, the storage device 1030, and the input/output devices 1040 can be interconnected via a system bus 1050. The processor 1010 is capable of processing instructions for execution within the computing system 1000. Such executed instructions can implement one or more components of, for example, a cloud platform. In some implementations of the current subject matter, the processor 1010 can be a single-threaded processor. Alternately, the processor 1010 can be a multi-threaded processor. The processor 1010 is capable of processing instructions stored in the memory 1020 and/or on the storage device 1030 to display graphical information for a user interface provided via the input/output device 1040.

The memory 1020 is a computer readable medium such as volatile or non-volatile that stores information within the computing system 1000. The memory 1020 can store data structures representing configuration object databases, for example. The storage device 1030 is capable of providing persistent storage for the computing system 1000. The storage device 1030 can be a floppy disk device, a hard disk device, an optical disk device, or a tape device, or other suitable persistent storage means. The input/output device 1040 provides input/output operations for the computing system 1000. In some implementations of the current subject matter, the input/output device 1040 includes a keyboard and/or pointing device. In various implementations, the input/output device 1040 includes a display unit for displaying graphical user interfaces.

According to some implementations of the current subject matter, the input/output device 1040 can provide input/output operations for a network device. For example, the input/output device 1040 can include Ethernet ports or other networking ports to communicate with one or more wired and/or wireless networks (e.g., a local area network (LAN), a wide area network (WAN), the Internet).

In some implementations of the current subject matter, the computing system 1000 can be used to execute various interactive computer software applications that can be used for organization, analysis and/or storage of data in various (e.g., tabular) format (e.g., Microsoft Excel®, and/or any other type of software). Alternatively, the computing system 1000 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 1040. The user interface can be generated and presented to a user by the computing system 1000 (e.g., on a computer screen monitor, etc.).

One or more aspects or features of the subject matter disclosed or claimed herein may be realized in digital electronic circuitry, integrated circuitry, specially designed application specific integrated circuits (ASICs), field programmable gate arrays (FPGAs) computer hardware, firmware, software, and/or combinations thereof. These various aspects or features may include implementation in one or more computer programs that may be executable and/or interpretable on a programmable system including at least one programmable processor, which may be special or general purpose, coupled to receive data and instructions from, and to transmit data and instructions to, a storage system, at least one input device, and at least one output device. The programmable system or computing system may include clients and servers. A client and server may be remote from each other and may interact through a communication network. The relationship of client and server arises by virtue of computer programs running on the respective computers and having a client-server relationship to each other.

These computer programs, which may also be referred to as programs, software, software applications, applications, components, or code, may include machine instructions for a programmable controller, processor, microprocessor or other computing or computerized architecture, and may be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium may store such machine instructions non-transitorily, such as for example as would a non-transient solid-state memory or a magnetic hard drive or any equivalent storage medium. The machine-readable medium may alternatively or additionally store such machine instructions in a transient manner, such as for example as would a processor cache or other random access memory associated with one or more physical processor cores.

To provide for interaction with a user, one or more aspects or features of the subject matter described herein may be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices may be used to provide for interaction with a user as well. For example, feedback provided to the user may be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive trackpads, voice recognition hardware and software, optical scanners, optical pointers, digital image capture devices and associated interpretation software, and the like.

Terminology

When a feature or element is herein referred to as being "on" another feature or element, it may be directly on the other feature or element or intervening features and/or elements may also be present. In contrast, when a feature or element is referred to as being "directly on" another feature or element, there may be no intervening features or elements present. It will also be understood that, when a feature or element is referred to as being "connected", "attached" or "coupled" to another feature or element, it may be directly connected, attached or coupled to the other feature or element or intervening features or elements may be present. In contrast, when a feature or element is referred to as being "directly connected", "directly attached" or "directly coupled" to another feature or element, there may be no intervening features or elements present.

Although described or shown with respect to one embodiment, the features and elements so described or shown may apply to other embodiments. It will also be appreciated by those of skill in the art that references to a structure or feature that is disposed "adjacent" another feature may have portions that overlap or underlie the adjacent feature.

Terminology used herein is for the purpose of describing particular embodiments and implementations only and is not intended to be limiting. For example, as used herein, the singular forms "a", "an" and "the" may be intended to include the plural forms as well, unless the context clearly indicates otherwise. It will be further understood that the terms "comprises" and/or "comprising," when used in this specification, specify the presence of stated features, steps, operations, processes, functions, elements, and/or components, but do not preclude the presence or addition of one or more other features, steps, operations, processes, functions, elements, components, and/or groups thereof. As used herein, the term "and/or" includes any and all combinations of one or more of the associated listed items and may be abbreviated as "/".

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

Spatially relative terms, such as "forward", "rearward", "under", "below", "lower", "over", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if a device in the figures is inverted, elements described as "under" or "beneath" other elements or features would then be oriented "over" the other elements or features due to the inverted state. Thus, the term "under" may encompass both an orientation of over and under, depending on the point of reference or orientation. The device may be otherwise oriented (rotated 90 degrees or at other orientations) and the spatially relative descriptors used herein interpreted accordingly. Similarly, the terms "upwardly", "downwardly", "vertical", "horizontal" and the like may be used herein for the purpose of explanation only unless specifically indicated otherwise.

Although the terms "first" and "second" may be used herein to describe various features/elements (including steps or processes), these features/elements should not be limited by these terms as an indication of the order of the features/elements or whether one is primary or more important than the other, unless the context indicates otherwise. These terms may be used to distinguish one feature/element from another feature/element. Thus, a first feature/element discussed could be termed a second feature/element, and similarly, a second feature/element discussed below could be termed a first feature/element without departing from the teachings provided herein.

As used herein in the specification and claims, including as used in the examples and unless otherwise expressly specified, all numbers may be read as if prefaced by the word "about" or "approximately," even if the term does not expressly appear. The phrase "about" or "approximately" may be used when describing magnitude and/or position to indicate that the value and/or position described is within a reasonable expected range of values and/or positions. For example, a numeric value may have a value that is +/−0.1% of the stated value (or range of values), +/−1% of the stated value (or range of values), +/−2% of the stated value (or range of values), +/−5% of the stated value (or range of values), +/−10% of the stated value (or range of values), etc. Any numerical values given herein should also be understood to include about or approximately that value, unless the context indicates otherwise.

For example, if the value "10" is disclosed, then "about 10" is also disclosed. Any numerical range recited herein is intended to include all sub-ranges subsumed therein. It is also understood that when a value is disclosed that "less than or equal to" the value, "greater than or equal to the value" and possible ranges between values are also disclosed, as appropriately understood by the skilled artisan. For example, if the value "X" is disclosed the "less than or equal to X" as well as "greater than or equal to X" (e.g., where X is a numerical value) is also disclosed. It is also understood that the throughout the application, data is provided in a number of different formats, and that this data, may represent endpoints or starting points, and ranges for any combination of the data points. For example, if a particular data point "10" and a particular data point "15" may be disclosed, it is understood that greater than, greater than or equal to, less than, less than or equal to, and equal to 10 and 15 may be considered disclosed as well as between 10 and 15. It is also understood that each unit between two particular units may be also disclosed. For example, if 10 and 15 may be disclosed, then 11, 12, 13, and 14 may be also disclosed.

Although various illustrative embodiments have been disclosed, any of a number of changes may be made to various embodiments without departing from the teachings herein. For example, the order in which various described method steps are performed may be changed or reconfigured in different or alternative embodiments, and in other embodiments, one or more method steps may be skipped altogether. Optional or desirable features of various device and system embodiments may be included in some embodiments and not in others. Therefore, the foregoing description is provided primarily for the purpose of example and should not be interpreted to limit the scope of the claims and specific embodiments or particular details or features disclosed.

One or more aspects or features of the subject matter described herein can be realized in digital electronic circuitry, integrated circuitry, specially designed application specific integrated circuits (ASICs), field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to programs, software, software applications, applications, components, or code, include machine instructions for a programmable processor, and can be implemented in a high-level procedural language, an object-oriented programming language, a functional programming language, a logical programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal.

The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

The examples and illustrations included herein show, by way of illustration and not of limitation, specific embodiments in which the disclosed subject matter may be practiced. As mentioned, other embodiments may be utilized and derived therefrom, such that structural and logical substitutions and changes may be made without departing from the scope of this disclosure. Such embodiments of the disclosed subject matter may be referred to herein individually or collectively by the term "invention" merely for convenience and without intending to voluntarily limit the scope of this application to any single invention or inventive concept, if more than one is, in fact, disclosed. Thus, although specific embodiments have been illustrated and described herein, any arrangement calculated to achieve an intended, practical or disclosed purpose, whether explicitly stated or implied, may be substituted for the specific embodiments shown. This disclosure is intended to cover any and all adaptations or variations of various embodiments. Combinations of the above embodiments, and other embodiments not specifically described herein, will be apparent to those of skill in the art upon reviewing the above description.

The disclosed subject matter has been provided here with reference to one or more features or embodiments. Those skilled in the art will recognize and appreciate that, despite of the detailed nature of the example embodiments provided here, changes and modifications may be applied to said embodiments without limiting or departing from the generally intended scope. These and various other adaptations and combinations of the embodiments provided here are within the scope of the disclosed subject matter as defined by the disclosed elements and features and their full set of equivalents.

A portion of the disclosure of this patent document may include material, which is subject to copyright protection. The owner has no objection to facsimile reproduction by any one of the patent documents or the patent disclosure, as it appears in the Patent and Trademark Office patent files or records, but reserves all copyrights whatsoever. Certain marks referenced herein may be common law or registered trademarks of the applicant, the assignee or third parties affiliated or unaffiliated with the applicant or the assignee. Use of these marks is for providing an enabling disclosure by way of example and shall not be construed to exclusively limit the scope of the disclosed subject matter to material associated with such marks.

What is claimed is:

1. A computer-implemented threat detection method comprising:
    discovering threat data associated with a first entity, the threat data including indicators of financial compromises (IOFC) associated with at least one of partial account information, compromised login information, malware netflow, malicious proxy session, compromised card information or phishing domains;
    translating the threat data to one or more threat models;
    translating the one or more threat models, using a threat model parameter generator, to at least a parameter threat model, the parameter threat model including parameters used to identify a threat target associated with the first entity;
    translating the parameter threat model to one or more identification queries based on computing technology or configuration used by the first entity's database implementation;
    executing the one or more identification queries and translating generated results to result data in a first format; and
    publishing one or more result data models from the result data in one or more formats or to one or more locations, the result data model including at least one of the first entity's unique customer identifier, compromise timestamp, threat tag, attribution tag, provider tag or feed tag from the result data.

2. The method of claim 1, wherein the result data is aggregated and translated to a second format based on a format suitable for use by the first entity.

3. The method of claim 1, wherein the result data is translated to a second format based on a format suitable for a computing technology used by the first entity.

4. The method of claim 1, wherein the parameter threat model includes parameters associated with at least one of equality, inequality, full text, and partial text matches, wherein the parameters are used to identify a threat target associated with the first entity.

5. The method of claim 1, wherein the parameter threat model is collected from a parameter model interface to translate the parameter threat model into the one or more identification queries.

6. The method of claim 1, wherein the computing technology is associated with at least one of a database query language or a distributed search engine utilized by the first entity for managing data.

7. The method of claim 1, wherein a single IOFC is utilized to create several threat models of the same or different threat model types.

8. A system comprising:
    at least one programmable processor; and
    a non-transitory machine-readable medium storing instructions that, when executed by the at least one programmable processor, cause the at least one programmable processor to perform operations comprising:
    discovering threat data associated with a first entity, the threat data including indicators of financial compromises (IOFC) associated with at least one of partial account information, compromised login information, malware netflow, malicious proxy session, compromised card information or phishing domains;
    translating the threat data to one or more threat models;
    translating the one or more threat models, using a threat model parameter generator, to at least a parameter threat model, the parameter threat model including parameters used to identify a threat target associated with the first entity;
    translating the parameter threat model to one or more identification queries based on computing technology or configuration used by the first entity's database implementation;
    executing the one or more identification queries and translating generated results to result data in a first format; and
    publishing one or more result data models from the result data in one or more formats or to one or more locations, the result data model including at least one of the first entity's unique customer identifier, compromise timestamp, threat tag, attribution tag, provider tag or feed tag from the result data.

9. The system of claim 8, wherein the result data is aggregated and translated to a second format based on a format suitable for use by the first entity.

10. The system of claim 8, wherein the result data is translated to a second format based on a format suitable for a computing technology used by the first entity.

11. The system of claim 8, wherein the parameter threat model includes parameters associated with at least one of equality, inequality, full text, and partial text matches, wherein the parameters are used to identify a threat target associated with the first entity.

12. The system of claim 8, wherein the parameter threat model is collected from a parameter model interface to translate the parameter threat model into the one or more identification queries.

13. The system of claim 8, wherein the computing technology is associated with at least one of a database query language or a distributed search engine utilized by the first entity for managing data.

14. A computer program product comprising a non-transitory machine-readable medium storing instructions that, when executed by at least one programmable processor, cause the at least one programmable processor to perform operations comprising:

discovering threat data associated with a first entity, the threat data including indicators of financial compromises (IOFC) associated with at least one of partial account information, compromised login information, malware netflow, malicious proxy session, compromised card information or phishing domains;

translating the threat data to one or more threat models;

translating the one or more threat models, using a threat model parameter generator, to at least a parameter threat model, the parameter threat model including parameters used to identify a threat target associated with the first entity;

translating the parameter threat model to one or more identification queries based on computing technology or configuration used by the first entity's database implementation;

executing the one or more identification queries and translating generated results to result data in a first format; and     publishing one or more result data models from the result data in one or more formats or to one or more locations, the result data model including at least one of the first entity's unique customer identifier, compromise timestamp, threat tag, attribution tag, provider tag or feed tag from the result data.

15. The computer program product of claim 14, wherein the result data is aggregated and translated to a second format based on a format suitable for use by the first entity.

16. The computer program product of claim 14, wherein the result data is translated to a second format based on a format suitable for a computing technology used by the first entity.

17. The computer program product of claim 14, wherein the parameter threat model includes parameters associated with at least one of equality, inequality, full text, and partial text matches, wherein the parameters are used to identify a threat target associated with the first entity.

18. The computer program product of claim 14, wherein the parameter threat model is collected from a parameter model interface to translate the parameter threat model into the one or more identification queries.

19. The computer program product of claim 14, wherein the computing technology is associated with at least one of a database query language or a distributed search engine utilized by the first entity for managing data.

\* \* \* \* \*